United States Patent [19]

Cogswell et al.

[11] Patent Number: 4,783,349

[45] Date of Patent: Nov. 8, 1988

[54] PROCESS FOR MAKING FIBRE REINFORCED PRODUCTS

[75] Inventors: Frederic N. Cogswell, Guisborough; Geoffrey Cowen, Eaglescliff; Eric Nield, Guisborough; Roger M. Turner, Whitby, all of England

[73] Assignee: Imperial Chemical Industries PLC, London, England

[21] Appl. No.: 702,726

[22] Filed: Feb. 19, 1985

[30] Foreign Application Priority Data

Mar. 6, 1984 [GB] United Kingdom ............... 8405844

[51] Int. Cl.$^4$ .......................... B05D 1/36; B05D 1/18
[52] U.S. Cl. ............................. 427/407.3; 427/385.5; 427/389.8; 427/430.1; 427/434.7; 427/443.2; 428/367; 156/166
[58] Field of Search ............... 427/389.8, 407.3, 385.5, 427/389.9, 434.6, 434.7, 434.5, 412, 443.2; 252/8.6; 156/166

[56] References Cited

U.S. PATENT DOCUMENTS

| | | | |
|---|---|---|---|
| 2,650,184 | 8/1953 | Biefeld | 427/407.3 X |
| 3,300,334 | 1/1967 | Gosnell | 427/389.8 X |
| 3,434,860 | 3/1969 | Ferguson et al. | 427/389.8 X |
| 3,461,027 | 8/1969 | Plueddemann | 427/407.3 X |
| 3,783,001 | 1/1974 | Marzocchi | 427/434.6 |
| 4,242,380 | 12/1980 | Courtoy | 427/389.8 X |
| 4,394,467 | 7/1983 | Edelman | 428/367 X |
| 4,541,884 | 9/1985 | Cogswell et al. | 156/166 |

FOREIGN PATENT DOCUMENTS

| | | | |
|---|---|---|---|
| 591403 | 8/1947 | United Kingdom | . |
| 1299941 | 12/1972 | United Kingdom | 427/407.3 X |
| 2038205 | 7/1980 | United Kingdom | . |

*Primary Examiner*—Thurman K. Page
*Attorney, Agent, or Firm*—Cushman, Darby & Cushman

[57] ABSTRACT

A method of producing a fibre reinforced structure by melt impregnation of continuous fibres with a thermoformable polymer melt comprising pre-wetting the filaments of the fibres with a composition containing a melt plasticizer for the thermoformable polymer, prior to introducing the pre-wetted fibres into the melt, optionally removing the plasticizer when the composition contains a polymer miscible with plasticizer to leave polymer coated filaments and introducing the pre-wetted filaments into a polymer melt, optionally a polymer melt containing a metal plasticizer for the melt and preferably removing the plasticizer from the composition by volatilization.

The pre-wetted polymer coated filaments are useful materials as reinforcing fibres for use in processes other than direct melt impregnation. They can be used in the process known as film stacking impregnation or in processes involving initial impregnation using particulate polymers or alternatively in conventional extrusion compounding.

6 Claims, No Drawings

PROCESS FOR MAKING FIBRE REINFORCED PRODUCTS

This invention relates to a process of impregnating fibrous structures with plastic materials to provide a thermoformable, fibre reinforced composite.

European Patent Publications Nos. 102 158 and 102 159 describe processes of impregnating fibrous structures by the use of a molten mixture of a thermoplastic polymer and a melt plasticiser for the polymer. In the processes described the fibrous structure is drawn through a molten mixture of the polymer and the plasticiser and the individual filaments of the fibrous structure are wetted by the mixture, preferably in a process in which there is a work input on the impregnated mixture to cause a movement of the melt relative to the filaments. An improved process has now been devised.

According to the invention there is provided a method of impregnating a fibrous structure, comprising continuous fibres, with a polymer to provide a thermoformable fibre-reinforced composite comprising introducing the fibre into molten polymer to provide the polymer matrix of the composite characterised in that the filaments of the fibrous structure prior to introduction into the molten polymer are provided with a coating material selected from (a) a plasticiser which is capable of plasticising said impregnating polymer when the polymer is molten (b) a mixture of a plasticiser which is capable of plasticising the impregnating polymer and up to 20% by weight of the plasticiser of a polymer miscible with said plasticiser and which polymer may be the same or different from the impregnating polymer and (c) a coating resulting from coating the filaments with the composition of mixture (b) and removing the plasticiser to provide a polymer coated fibre.

The fibrous structures used in the invention include any of the commercially available forms of fibrous structures. Thus suitable fibrous structures containing aligned fibres include rovings of continuous fibres and woven fabrics. Structures in which the fibres are randomly disposed, such as mats of randomly disposed fibres in which the fibres are preferably longer than 25 mm, may also be used. Structures having high integrity are preferred because they can be pulled through a melt containing polymer with less risk of fibre breakage or complete disintegration of the structure.

The material which is capable of acting as a melt plasticiser for the impregnating polymer which will form the matrix of the impregnated structure should have a sufficiently high boiling point to remain present when introduced into the molten polymer for a sufficient time to enable the material to plasticise the polymer and produce a molten mixture of lower viscosity than that of the molten polymer when not containing plasticiser. The plasticiser differs from a conventional solvent in not being capable of providing a solution of the polymer below the glass transition temperature (Tg) of the polymer. Preferably, the plasticiser should be involatile below the Tg of the polymer used. The volatility of the plasticiser may be such that it can be readily removed by holding the impregnated structure for a sufficient time at an elevated temperature below the thermal decomposition temperature of polymer and preferably above the Tg of the polymer and desirably at a temperature at which the polymer is molten or it may be involatile at temperatures below the thermal decomposition temperature of the polymer. In the latter case the plasticiser may be removable by solvent extraction or it may be of such a nature that its presence in the final composite can be tolerated for some applications.

The plasticising material may contain other additives, particularly polymeric additives which are plasticised by the plasticiser. The polymer may be of the same chemical nature as the polymer which is to form the matrix of the structure or it may be of different chemical structure. It may also be the same or different in respect of molecular weight. When a polymeric additive is present it is preferred that it is present at a concentration of less than 20% by weight of the plasticiser. When a polymer is present in the plasticising material the temperature of the plasticising material must be raised to a temperature at which the additive polymer is molten so that it forms part of the wetting medium for the fibres, but need not necessarily be above the melting point of the polymer itself. Suitable plasticising material can be formed by melting the polymer, adding plasticiser and cooling to a temperature below the melting point of the polymer. Alternatively, the polymer can be heated with the plasticiser at an elevated temperature below the melting point of the polymer to form a molten mixture.

The plasticising material may be deposited on the fibrous structure in a variety of ways dependent on the nature of the plasticising material. For example, when it consists solely of a plasticiser it may be deposited from solution or as a dispersion in an immiscible liquid such as water. Alternatively it can be applied as a melt to the fibrous structure. It may also be present as part of a size composition applied to the filaments to protect them against abrasion and increase adhesion to polymer matrices. It should ideally be applied at sufficiently low viscosity to permit complete filament wetting without the need to apply a work input to the fibres. However applied, it may be advantageous to cause partial volatilisation of the plasticiser from the fibrous structure before or during the introduction of the structure into the melt because separation of the individual filaments in the structure is aided by such volatilisation. When a polymeric additive is present in the plasticising material it is possible to remove most if not all of the plasticiser prior to entry of the wetted structure into the molten polymer which is to form the matrix of the final structure, because the plasticiser/polymer composition will have substantially completely wetted and separated the filaments and subsequent removal of the plasticiser will leave a fibrous structure consisting of filaments thoroughly wetted by the polymeric additive. Preferably the plasticiser should be removed by volatilisation. The polymeric additive used should be such as to have a thermal decomposition temperature above a temperature at which the plasticiser can be volatilised from the coating. Such polymer coated structures will be capable of being readily wetted by further thermoplastic, which may be the same or different from the polymer coating on the filaments when introduced to a melt of thermoplastic or a mixture of thermoplastic and plasticiser in the form of a melt.

It is preferred that whether or not the fibrous structure still contains plasticiser that it should be introduced at an elevated temperature into the polymer melt which is to form the matrix of the final polymer.

The product which has been pre-coated with the mixture of plasticiser and polymer and which has had the plasticiser removed, preferably by volatilisation, can be regarded as an intermediate product. The process could be interrupted at this stage to provide a polymer-sized fibre which can be used in a variety of impregnation processes in addition to the present process. For example, the product would be of use in the film stacking process, wherein preformed films of polymer are laid up with layers of fibres, and impregnation achieved by compression at high temperatures for lengthy periods. The use of pre-wetting fibres prepared according to the present invention would enable easier impregnation and/or reduced cycle times. The pre-wetted fibre would also be of use in the various known impregnation processes in which particulate polymeric material is introduced between the continuous filaments of, for example, a roving. The use of the prewetted fibres of the present invention permits easier consolidation when such powder/filament structures are eventually melt-consolidated. Furthermore, the intermediate product can be chopped into strands for incorporation in conventional processes such as extrusion compounding to provide granules of thermoplastics containing relatively randomly dispersed short fibres.

The intermediate product is particularly valuable when the coating applied to wet the fibres is a crystalline polymer, particularly a high-melting point, aromatic polymer. In thermoformable composites the properties of the composite are often critically determined, particularly in respect of resistance to environmental attack, by the interface between the polymer matrix and the fibre. In this respect crystalline polymers, particularly high melting point, aromatic polymers show good environmental resistance when used as the matrix polymer in composites. Such high melting polymers are not only difficult to dissolve to use in solvent impregnation methods, but also have high melt viscosities making melt impregnation different. It has now been found that the benefits of their excellent physical properties can be made use of as a crystalline polymer shield on the fibre with a different polymer such as an amorphous polymer providing the matrix of the composite. The impregnation with the different matrix polymer may be inherently easier but in any event is aided by the fact that the filaments have been pre-separated and pre-wetted with the crystalline polymer shield. It is advantageous if at some stage in the production of the composite or in the fabrication of articles from the composite the composite is heated to a temperature above the melting point of crystalline polymer shield.

According to this aspect of the invention there is provided a coated filament, particularly a carbon filament, having a coating of 0.1 to 10% by volume of the fibre of a crystalline, thermoformable polymer, preferably a high melting point, aromatic polymer.

A particularly useful class of such polymers are the polyaryl ethers, examples of which are disclosed in British Patent Nos. 971 227, 1 016 245, 1 060 546 and 1 078 234 and U.S. Pat. Nos. 3,442,857 and 3,953,400. Particularly useful polyaryletherketones are described in British Patent No. 1 414 421 and European Patent No. 1879.

A preferred coated filament comprises carbon fibre coated with a crystallisable polyaryletherketone of repeat unit —Ph—O—Ph—CO— (where —Ph— represents a para-phenylene unit).

Composites formed from these intermediate pre-coated fibres comprise fibres coated with a crystalline thermoformable polymer, preferably a high melting point, aromatic polymer embedded in a matrix polymer which may be the same or different from the crystalline polymer of the coating and may be crystalline or amorphous.

The concentration of plasticising material present on the fibrous structure as a result of the pre-coating stage should be at least sufficient to coat the total surface area of the individual filaments of the fibrous structure at a stage of the process prior to the wetted structure being introduced into a polymer melt. When the pre-coated fibre entering the polymer melt still carries a coating of plasticiser it is preferred that at least 1% and desirably at least 5% by weight of plasticiser based on the weight of the fibrous structure, should be used. Considerably higher concentrations, for example 50% by weight or more, can be used when the plasticiser is a material that can be readily removed by volatilisation below the decomposition temperature of the polymer. When a suitable polymeric additive is used with the plasticising material the structure entering the polymer melt may contain little or no plasticiser providing that the filaments of the structure are completely wetted by the polymeric additive.

The concentration of plasticiser present on the wetted fibre structure entering the polymer melt will depend to some extent on the molecular weight or melt viscosity of the polymer forming the melt. When the polymer has a low melt viscosity, for example less than 30 Ns/m$^2$ measured at zero shear rate at the temperature used in the impregnation process, good wetting of the individual filaments can be achieved with little or no plasticiser additional to that required to coat the filament surfaces. When the polymer has a higher molecular weight the concentration of plasticiser relative to the polymer of the melt should preferably be within the weight ratio range 1:4 to 99:1 of polymer to plasticiser, preferably between 1:1 and 19:1. These concentrations refer to the stage of the process where the structure is subjected to means for causing the melt to flow relative to the filaments. For convenience the plasticiser-treated fibrous structure should be introduced into a plasticiser-free polymer melt, but the invention includes the process of introducing the plasticiser-treated fibrous structure into a polymer melt which contains plasticiser. In any event plasticiser present on the fibrous structure will accumulate in the polymer melt into which the wetted structure is introduced. As previously indicated it is also possible to achieve satisfactory impregnation using a fibrous structure which is substantially free of plasticiser providing it has been obtained by a process in which a plasticiser/polymer melt is used for initial wetting of the structure and the plasticiser component is subsequently substantially completely volatilised leaving polymer coated filaments.

The plasticiser-treated fibrous structure may be introduced into the molten polymer in various ways. The structure may be conveyed through a bath of molten polymer, for example by pulling the fibrous structure through the melt. This process is only applicable to fibrous structures having sufficient strength to withstand the tension created by such a pultrusion process. Where the fibrous structure has insufficient strength for such a process it must be conveyed on a support through the melt.

In a preferred process the plasticiser-treated structure contains sufficient continuous fibres in a given direction to be tensioned against a surface, preferably a heated surface, so that a nip is formed by the surface and the structure, and at which nip a feed of polymer melt can be provided. This localisation of the polymer melt enables the quantity of molten polymer at a given time to be reduced thus reducing the problems arising from polymer degradation. Biassing of the structure against the surface, and optionally against successive surfaces over which the impregnated structure is passed, enables the melt to be caused to flow through the structure causing substantially complete wetting of the filaments of the structure.

In processes in which the melt plasticising material is a material which can be volatilised from the structure below the thermal decomposition temperature of the melt it is less necessary to provide a work input to the molten polymer in te structure because the act of volatilisation causes the melt to flow relative to the filaments and contribute substantially to the wetting of the filaments.

The upper limit of fibre content in the products obtained by use of the invention is determined by the amount of polymer required to wet out the individual filaments of the fibrous product. In general it is difficult to achieve good wetting with less than 20% by volume of polymer although excellent results are obtainable by using the process of the invention to incorporate 35% by volume of polymer in the fibre-reinforced composition. Preferably the products obtained from the process of the invention contain at least 30% by volume of fibres.

The reinforcing fibre may be glass, carbon or a high modulus synthetic polymer fibre.

The thermoformable polymers used in the process of the invention for either pre-coating the filaments or providing the matrix of composites are preferably those containing aromatic repeat units in the chain, such as polysulphones, polyethersulphones, polyetherketones, polyetheretherketones, polyarylene oxides, polyarylene sulphides, aromatic polyamides, aromatic polyesters, aromatic polycarbonates and thermoplastic polyimides especially polyetherimides. In general, the thermoplastic aromatic polymers used in the compositions of this invention comprise repeat units of the general formula —Ar—X— where Ar is selected from mono or polycyclic aromatic radicals and X is selected from at least one of O, S, SO₂, O.CO, O.CO.O, CO, —NHCO— and

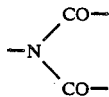

AR and/or X may vary from unit to unit in the polymer chain.

Particularly useful are the class of polyetherketones which contain the recurring unit (I):

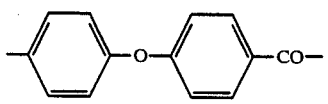

Such polymers are disclosed, inter alia, in British patent specification No. 1 414 421 which describes such polymers containing the unit (I) as the sole repeating unit or in conjunction with the repeating unit (II):

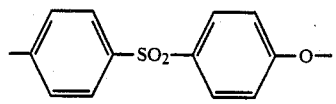

A preferred polyetheretherketone having the repeating unit (III):

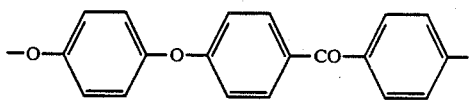

either alone or in conjunction with other repeating units is disclosed in European patent publication No. 1879.

Examples of polyethersulphones and processes for their production are described in British patent specifications Nos. 1 016 245, 1 060 546, 1 078 234, 1 109 842, 1 122 192, 1 133 561, 1 153 035, 1 153 528, 1 163 332, 1 177 183, 1 234 301, 1 264 900, 1 265 144, 1 296 383, 1 298 821 and 1 303 252, Canadian patent specification No. 847 963, German OLS specification Nos. 938 806 and 2 433 400 and Swiss patent specification No. 491 981.

Although useful reinforced products can be produced from thermoformable plastics having a melt viscosity at zero shear rate at the temperature of the impregnation process within the range 1–30 Ns/m² it is preferred that the viscosity of the polymer used should be greater than 30 Ns/m², desirably greater than 50 Ns/m² and even more desirably at least 100 Ns/m². Molecular weights of the matrix polymer can be increased after the impregnation stage by known techniques.

The plasticisers which are suitable for use in the invention are materials which are thermally stable at the elevated temperatures which are characteristic of the melting points of the thermoplastic polymers used in the invention. They may be plasticisers which can be volatilised from the composition at temperatures below the decomposition temperature of the thermoplastic polymer but which are sufficiently involatile at the temperature employed in the impregnation process to provide a plasticised polymer melt of lower melt viscosity than the polymer itself. Alternatively, they may be materials which are not volatilised at temperatures below the decomposition temperature of the thermoplastic polymer but allow acceptable properties to be obtained from the composite even though the material is still present in the composite or are materials which can be removed by solvent extraction. In the case of aromatic polymers suitable plasticisers having these characteristics are found in the classes aromatic ketones, aromatic sulphones and aromatic esters. Typical high boiling materials are diphenyl sulphone, ditolyl sulphone, benzophenone, phenyl benzoate, diphenyl carbonate and benzyl benzoate.

Although the major use of the impregnated composite products obtained from the impregnation processes hereinbefore described is in applications requiring the use of long lengths of the products, that is greater than 100 mm long, the products find particular utility when chopped into pellets or granules in which the reinforcing fibres have a length of at least 3 mm and preferably at least 10 mm. These products may be used in the conventional fabrication process such as injection moulding and show advantages over prior art products in pellet form because the fibre length in the pellet is retained to a much greater extent in articles fabricated from the pellets of the invention than when using the prior art products. This greater retention of fibre length is believed to be a result of the greater protection afforded to the individual reinforcing filaments in the product of the invention by virtue of the good wetting by polymer which arises from use of the processes hereinbefore described.

This aspect of the invention is particularly important because it enables reinforced articles to be formed in versatile operations, such as injection moulding, which employ screw extrusion processes to melt and homogenise the feed material, with a surprisingly high retention of fibre length and consequent enhancement of physical properties. Thus the product of the invention enables moulded articles to be obtained from fabrication processes which employ screw extrusion which articles contain at least 50% and preferably at least 70% by weight of the fibres in the article of a length of at least 3 mm long. This is considerably longer than currently obtainable from the commercially available reinforced products.

The products suitable for injection moulding may be used directly or may be blended with pellets of other thermoplastics products. These other products may be of the same polymer but having different molecular weight or may be of a different polymer providing that the presence of the different polymer does not adversely affect the overall balance of properties of the composition. The other products may be an unfilled polymer or may contain a particulate or fibrous filler. Blends with materials containing the conventionally produced reinforced moulding powders, that is moulding powders with reinforcing fibres up to about 0.25 mm long are particularly suitable because the overall reinforcing fibre content of the blend can be kept high to produce maximum strength even though the shorter reinforcing fibres do not contribute so effectively as the long fibres present from the product of the present invention.

COMPARATIVE EXAMPLE A 25 tapes of continuous carbon fibres (supplied by Hercules Corporation and designated AS4 carbon fibres) each containing 12,000 individual filaments were drawn at a rate of 0.4m/minute over a series of stationary guide bars to provide a web of width about 150 mm. When the fibres had been guided into contiguous relationship they were pulled over a series of four fixed cylindrical bars of 32 mm diameter maintained between 380° and 420° C. An additional bar was present adjacent the first bar and sufficiently spaced from it to enable the web to pass between the bars. A dry powder mixture of equal weights of polyetheretherketone and diphenyl sulphone was fed to the hopper to supply the powder blend to either side of the web as it passed between the first two bars. The polyetheretherketone (PEEK available from ICI PLC) had a melt viscosity (measured at 380° C. and a shear rate of 1000 sec$^{-1}$) of 100 Ns/m$^2$. The powder melted rapidly to provide a melt pool at the nip between these two bars. The web was passed over and under the three further heated bars. Substantially all of the diphenyl sulphone was evolved during this process and was removed with an extraction fan.

The continuous impregnated sheets produced were about 150 mm wide and 0.1 mm thick.

The mechanical properties of this product were evaluated as plaques with uniaxially disposed carbon fibres by compressing 20 layers of the sheet to give a sample 2 mm thick, 50 mm wide and 150 mm long. The results obtained are given in Table 1.

The use of a powder feed consisting of the polyetheretherketone of melt viscssity 100 Ns/m$^2$ and not containing the melt plasticiser results in unsatisfactory impregnation at this haul through speed (0.4 m/min).

EXAMPLE 1

The procedure of Comparative Example A was modified by providing a pre-sizing bath before the hopper supplying the polymer powder to the nip between the first two bars and after the tapes had been formed into a web of contiguous fibres by tensioning over the guide bars. The presizing bath was provided with a heater and a guide bar was located in the bath so that the web could be drawn under it. The bath was filled with diphenyl sulphone and heated to 200° C. to liquefy it. The web of fibres was drawn under the guide roller immersed in the melt and on emerging had collected about 50% by weight of diphenyl sulphone (based on combined weight of fibre and melt plasticiser). This presized fibre was then fed through the hopper as described in Comparative Example A using the same dry powder feed in the hopper.

The sheet product obtained was evaluated as described in Comparative Example A and the results are given in Table 1.

The above procedure was repeated using (a) a powder feed in the hopper consisting solely of the specified polyetheretherketone without melt plasticiser and (b) using a haul through rate of 1 m/min (using the 1:1 PEEK/DPS powder blend feed.

The properties obtained using these procedures are also detailed in Table 1.

TABLE 1

| Sample | Haul Through Speed m/min | DPS:PEEK Ratio | Wt % Carbon Fibre | (1) Transverse Flex Strength MN/M$^2$ | (2) Short Beam Shear MN/M$^2$ | Flexural Modulus GN/M$^2$ | Flexural Strength MN/M$^2$ |
|---|---|---|---|---|---|---|---|
| DPS Presize (A) | 0.4 | 50:50 | 68 | 152 | 106 | 127 | 1,767 |
| DPS Presize (B) | 0.4 | 0:100 | 71 | 153 | | | |
| DPS Presize (C) | 1.0 | 50:50 | 69 | 138 | 103 | 126 | 1,846 |
| Control (Comparative Example A) | 0.4 | 50:50 | 67 | 140 | | | |
| Control (Comparative | 0.4 | 0:100 | 70 | 94 | 88 | 110 | 1,825 |

TABLE 1-continued

| Sample | Haul Through Speed m/min | DPS:PEEK Ratio | Wt % Carbon Fibre | (1) Transverse Flex Strength MN/M$^2$ | (2) Short Beam Shear MN/M$^2$ | Flexural Modulus GN/M$^2$ | Flexural Strength MN/M$^2$ |
|---|---|---|---|---|---|---|---|
| Example A) | | | | | | | |

(1) Measured according to ASTM D790-80.
(2) Measured according to ASTM D2344-72 using a span to sample thickness ratio 5:1.

The results obtained indicate that presizing with DPS improves the wetting/impregnation at constant line speed and allows the haul through speed (productivity of the process) to be increased without major deterioration of the mechanical properties.

EXAMPLE 2

The general procedure of Example 1 was followed to assess different melt plasticisers in the presizing process. These are listed in Table 2.

In these experiments only eight ends of the AS4 fibre were used (12,000 filaments each) to give a web width of about 50 mm. The presizing bath was held at different temperatures to ensure the compounds were liquid.

The heated bars were 18 mm in diameter and the line speed was 0.3 m/min.

TABLE 2

| | Melting Point °C. | Boiling Point °C. | Bath Temperature °C. |
|---|---|---|---|
| Benzophenone | 48 | 305 | 80 |
| Diphenyl Phthalate | 73 | 250 | 100 |
| Diphenyl Carbonate | 78 | 301 | 100 |
| Diphenyl Sulphone | 124 | 379 | 200 |

In all cases the powder used in the hopper was wholly composed of polyetheretherketone having a melt viscosity of 108 Ns/m$^2$ (measured at 380° C. and a shear rate of 1000 sec$^{-1}$). Continuous impregnated sheets about 50 mm wide and 0.1 mm thick were laid up and compressed to give a sample 2 mm thick, 50 mm wide and 150 mm long. Results for the different composites are given in Table 3 with comments on the wetting as assessed in production.

TABLE 3

| Sample | Presize | PEEK/ plasticiser ratio | Wt % Carbon Fibre | Transverse Flexural Strength MN/M$^2$ |
|---|---|---|---|---|
| D (Control) | — | 50:50 | 65 | 108 |
| E | Diphenyl Carbonate | 50:50 | 63 | 113 |
| F | Benzophenone | 50:50 | 63 | 172 |
| G | Diphenyl Phthalate | 50:50 | 69 | 139 |
| H | Diphenyl Sulphone | 50:50 | 65 | 142 |

EXAMPLE 3

The general procedure of Example 1 was followed with the modification that the presizing bath contained a mixture of diphenyl sulphone )DPS) and 1% by weight of the diphenyl sulphone of the polyetheretherketone used in Example 1. The bath was raised to 300° C. At this temperature the polymer was dissolved in the DPS. The carbon fibre was drawn under a roller immersed in the fluid DPS and over a bar maintained at 200° C. before being drawn through the hopper sited above the first two heated bars as described on Comparative Example A. These heated bars were maintained between 380° C. and 420° C. and the powder fed to the hopper was a polyetheretherketone powder of melt viscosity 100 Ns/m$^2$ (as in Example 1) without melt plasticiser. 25 rovings of Hercules Corporation AS4 carbon fibre (each of 12,000 filaments) were pulled through the impregnation system at a rate of 0.4 m/min to provide an impregnated band 150 mm wide. The product was formed into a consolidated sample of dimensions 150 mm long, 50 mm wide and 2 mm thick as described in Comparative Example A.

The procedure was repeated using a presizing mixture of DPS containing 5% by weight of the polyetheretherketone polymer.

The transverse flexural strength values were 145 and 164 MN/m$^2$ respectively.

EXAMPLE 4

A tow of carbon fibre containing 12000 filaments (Hercules Corporation AS4 carbon fibre) was pulled through a bath of diphenyl sulphone containing 1% by weight of the plasticiser of a polyetheretherketone having a melt viscosity (measured at 400° C. and zero shear rate) of 25 Ns/m$^2$. The bath was maintained at 250° C. The tow was pulled under a roller immersed in the plasticiser mixture. The tow emerging from the bath had picked up about 60% by weight of the plasticiser mixture (based on total of fibre and plasticiser mixture weights). The resulting product was placed in a vacuum oven for 16 hr at 200° C. to remove the plasticiser. Scanning electron microscopy examination of the filaments showed that the residual polymer was present as a patchy, uneven coating. This product is nevertheless useful as an intermediate product for use in the present invention and for use as a reinforcing fibre in other processes.

The product was heated to 400° C. for 5 minutes. Examination of the coating by scanning electron microscopy showed it to have flowed so that it was present as a more uniform coating on the individual filaments.

The procedure was repeated using a DPS plasticiser mixture containing 3% by weight of a polyetheretherketone of melt viscosity 100 Ns/m$^2$ measured at 380° C. and a shear rate of 1000 sec$^{-1}$). The fibre dried at 200° C. showed a patchy, uneven coating. Heating at 400° C. for 7 minutes improved the distribution of polymer on the fibre but it was more uneven than the coating from the low viscosity resin.

EXAMPLE 5

A composite of carbon fibres (Hercules Corporation AS4 carbon fibres) in a polyetheretherketone of melt viscosity of 110 Ns/m$^2$ (measured at zero shear rate at 380° C.) was prepared according to the procedure described in Example 1 of European Patent Publication No. 102 159. The composition was formed into a plaque by compressing 20 layers of the tape produced to give a sample 2.5 mm thick, 50 mm wide and 150 mm long. The plaque was subjected to impact to propagate a crack parallel with the filaments in the laminate. The new surfaces generated were examined by scanning electron miscroscopy. It was evident that failure had occurred in the resin phase showing ductile drawing of the resin. The fibres remained covered by resin indicating the strength of the bond between the carbon fibres and the polyetheretherketone.

A composite of polyethersulphone containing the same carbon fibres prepared according to Example 2 of European Patent Publication 102 159 was subjected to the same procedure. Inspection of the surfaces showed that the resin had peeled away from the carbon fibres.

The intermediate pre-coated products of the present invention enable a composite to be made according to the method of the invention in which a carbon fibre provided with a coating of polyetheretherketone can be used in an impregnation process to provide a polyethersulphone matrix/carbon fibre composite in which there is an interface of polyetheretherketone between the carbon fibre and the polyethersulphone. Thus an amorphous and less expensive matrix is separated from the carbon fibre by a crystalline polymer shield having the desirable interface properties conferring excellent environmental resistance and impact behaviour.

We claim:

1. A method of impregnating a fibrous structure, comprising continuous fibres with a polymer to provide a thermoformable fibre-reinforced composite comprising introducing the fibres into molten polymer to provide the polymer matrix of the composite chracaterised in that the filaments of the fibrous structure prior to introduction into the molten polymer are provided with a coating material selected from the group consisting essentially of:

(a) a plasticiser which is capable of plasticising said impregnating polymer when the polymer is molten;

(b) a mixture of a plasticiser which is capable of plasticising the impregnating polymer and up to 20% by weight of the plasticiser of a polymer miscible with said plasticiser and which polymer may be the same or different from the impregnating polymer; and (c) a coating resulting from coating the filaments with the composition of mixture (b) and removing the plasticiser to provide a polymer coated fibre.

2. A process according to claim 1 wherein the pre-coated fibre introduced to the molten polymer contains at least 1% by weight of the fibre of the plasticiser.

3. A process according to either of claims 1 in which the pre-coat is deposited on the fibre by passing the fibre through a molten plasticiser composition.

4. A process according to any one of claims 1 in which the plasticiser is a material which can be volatilised from a melt of the polymer used to provide the matrix polymer at a temerature below the thermal decomposition temperature of the matrix polymer.

5. A process according to any one of claims 1 in which the plasticiser is a material which can be volatilised from the coating composition (b) below the thermal decomposition temperature of the polymer of the coating composition.

6. A process according to any one of claims 1 in which the pre-coating comprises a crystalline polymer and the matrix polymer is an amorphous polymer.

* * * * *